June 26, 1962     G. R. SIMPSON     3,040,616
GOGGLES AND THE LIKE

Filed Dec. 26, 1958     4 Sheets-Sheet 1

INVENTOR
GEORGE R. SIMPSON
BY Louis L. Gagnon
Noble J. Williams
ATTORNEYS

June 26, 1962 G. R. SIMPSON 3,040,616
GOGGLES AND THE LIKE
Filed Dec. 26, 1958 4 Sheets-Sheet 2
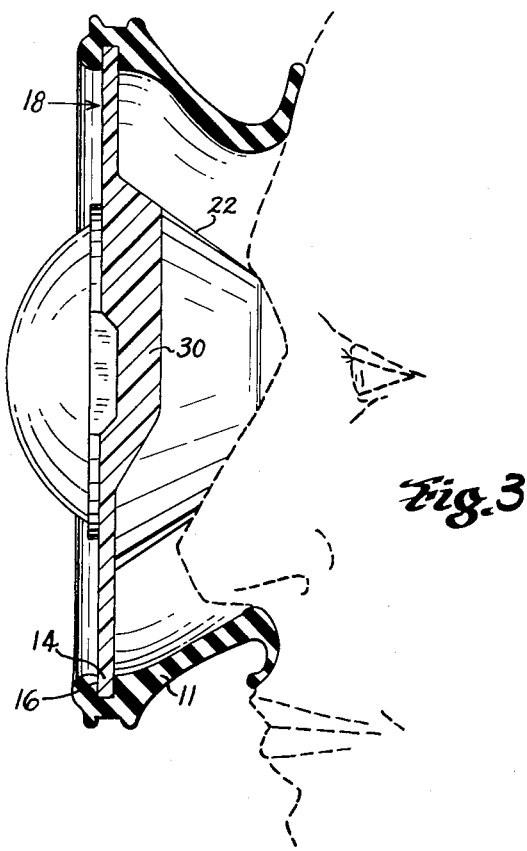
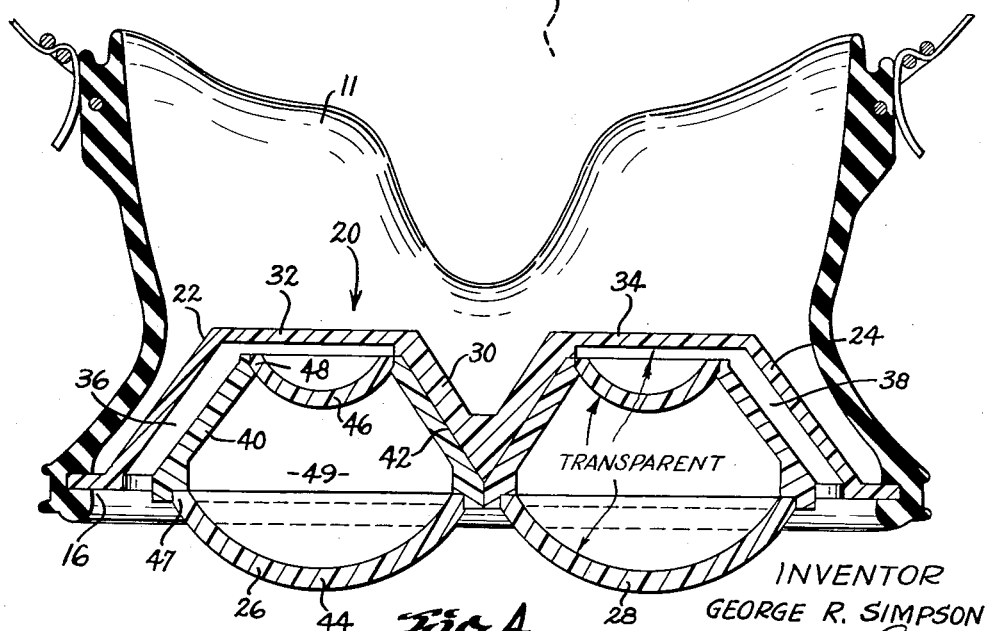
INVENTOR
GEORGE R. SIMPSON
BY Louis L. Gagnon
Noble S. Williams
ATTORNEYS

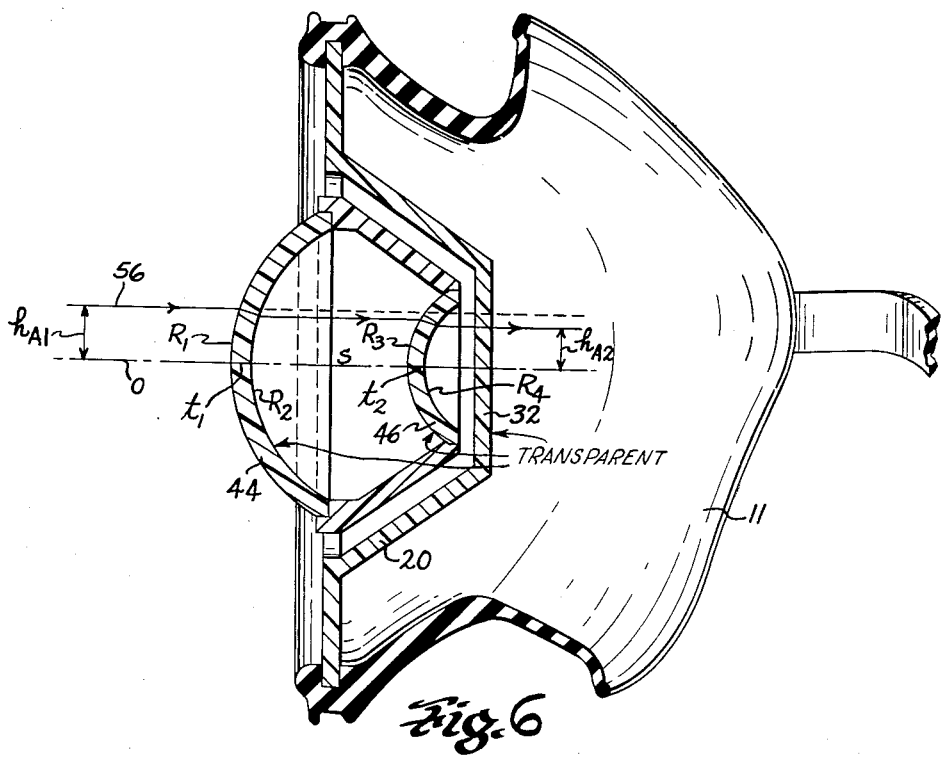
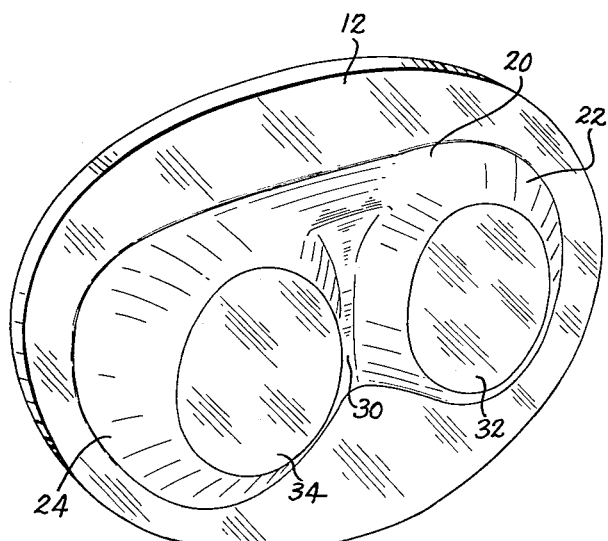

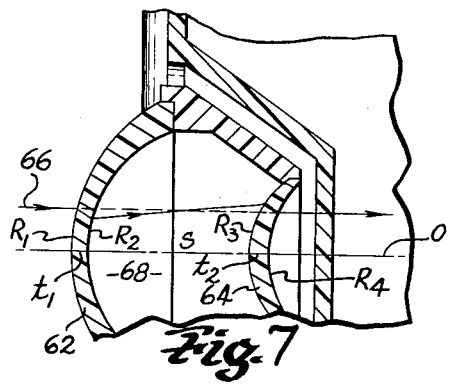
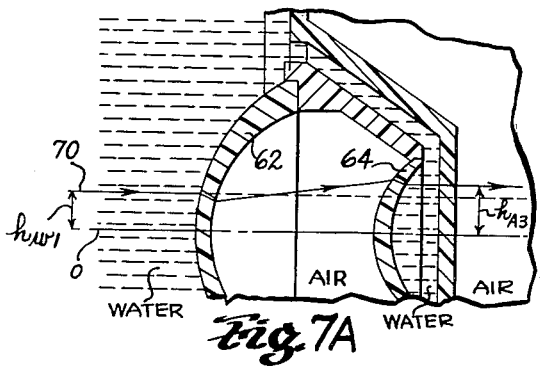
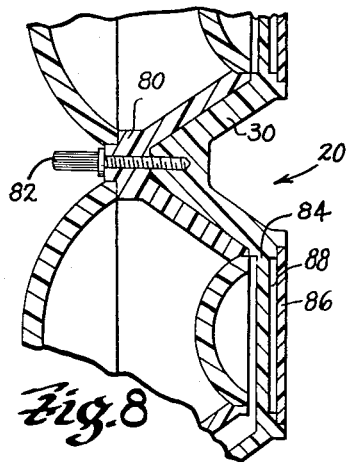
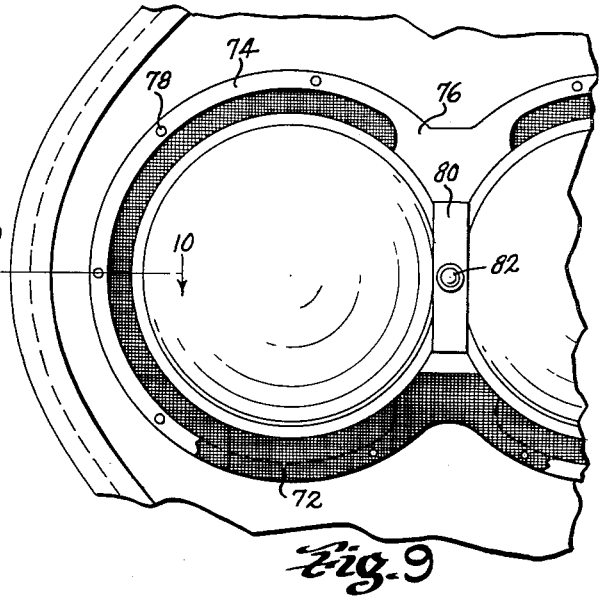
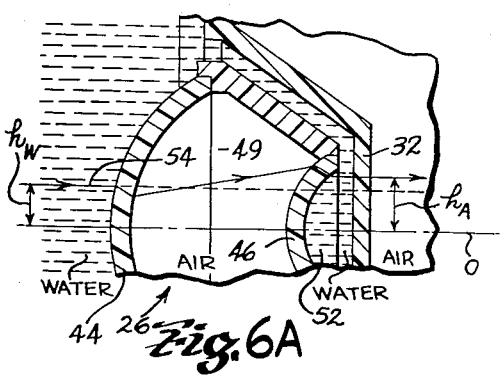
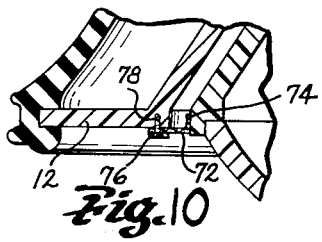

United States Patent Office 3,040,616
Patented June 26, 1962

3,040,616
GOGGLES AND THE LIKE
George R. Simpson, South Woodstock, Conn., assignor to American Optical Company, Southbridge, Mass., a voluntary association of Massachusetts
Filed Dec. 26, 1958, Ser. No. 783,054
8 Claims. (Cl. 88—1)

This invention relates to improvements in goggles and similar object-viewing devices. More particularly, the invention relates to underwater goggles and similar object-viewing devices equipped with optical means of such improved novel construction and optical design as to enable the person wearing the optical means to view, while under water or while in air, objects at various distances clearly and without any appreciable visual distortion, or magnification or minification being apparent therein.

While underwater goggles, protective face masks and the like of many different types and designs have been in use for some time, nevertheless, entirely satisfactory results during use thereof have not been obtained. For example, one of the more common types of underwater goggles being used at the present time and arranged to keep water away from the eyes and nose of the wearer employs a flexible face piece, preshaped to fit closely against the face of a wearer surrounding his or her eyes and nose, and a relatively large flat disk-like plate of transparent plastic or the like serving as a window in a sight opening therein. While such known devices will keep water away from the eyes of the wearer and thus enable him to see and focus upon objects while under water (an act which he will not be able to do if the goggles are removed so that the water comes into contact with the eyes) and will also enable him to see objects clearly in air without removing his goggles, nevertheless, he will not observe objects while under water in their true size or true perspective. This is because water has an appreciably higher refractive index than air and, accordingly, a very material foreshortening effect is produced while under water. Underwater objects appear closer and larger to the wearer of such goggles than they should.

Attempts have also been made to provide underwater goggles and the like with lenses so that submerged objects may be seen clearly and in true perspective but such lenses have been far from satisfactory since the wearer was required to remove his goggles before he could obtain a clear view of his surroundings when he came to the surface.

It is, accordingly, an object of the present invention to provide in combination with underwater goggles and like devices an improved optical system or systems which will enable such goggles or devices to be used both while under water and while in air without distortion and at unit magnification, and without necessitating an adjustment in or the removal of said optical system.

It is also an object of the invention to provide underwater goggles and similar devices with improved optical systems which will protect the eyes of the wearer and at the same time give the wearer a clear view of his or her surroundings in very nearly true size and perspective both while submerged and while in air.

It is an additional object of the invention to provide in a device of the above character novel lens means for enabling clear vision and perspective while in air and while submerged and which lens means is of such construction and arrangement that same does not materially add to the weight of the goggles while in air or the cumbersomeness thereof while being used under water.

It is another object of the present invention to provide in a device of the character described means which will tend to prevent foreign matter such as sand and floating vegetation from entering between parts of the optical system and interfering with the view obtained through the optical system.

It is also an object of the invention to provide in a device of the above character a readily detachable construction and arrangement of parts and easily operable means whereby the lens means thereof may be dis-assembled and cleaned for better vision or the like at any time whether in air or under water and without removal of the goggles from their operative position; and without seriously affecting the wearer's vision.

It is an additional object of the invention to provide in a device of the character described an improved optical lens design which will give a substantially unit magnification and correct perspective to objects being observed therethrough both while in air and while under water.

It is an additional object of the present invention to provide in conjunction with a device of the above character an optical system which is of sturdy and compact construction and which is of a relatively inexpensive construction.

Other objects and advantages of the invention will become apparent from the detailed description which follows when taken in conjunction with the accompanying drawings in which:

FIG. 3 is a vertical sectional view taken substantially upon section line 3—3 of FIG. 2 and looking in the direction of the arrows;

FIG. 4 is a horizontal sectional view taken substantially upon section line 4—4 of FIG. 2 and looking in the direction of the arrows;

FIG. 5 is a perspective side-rear view of the lens supporting structure of the goggles of FIG. 1;

FIG. 6 is a vertical sectional view taken substantially on section line 6—6 of FIG. 2 and looking in the direction of the arrows;

FIG. 6A is a fragmentary view showing the lens and lens supporting structure of FIG. 6 submerged in water;

FIG. 7 is a fragmentary sectional view showing a modified form of the invention;

FIG. 7A is a fragmentary view similar to FIG. 7 but showing the structure submerged in water;

FIG. 8 is a horizontal sectional view showing a modified form of the invention;

FIG. 9 is a front view of the structure of FIG. 8; and

FIG. 10 is a fragmentary sectional view taken upon section line 10—10 of FIG. 9 and looking in the direction of the arrows.

Figure 1:
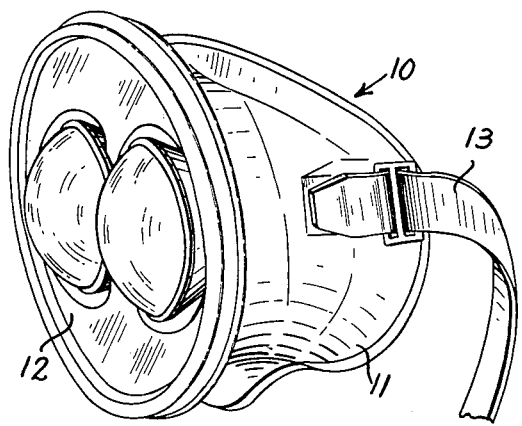
FIG. 1 is a perspective side-front view of a pair of underwater goggles embodying the present invention.
Figure 2:
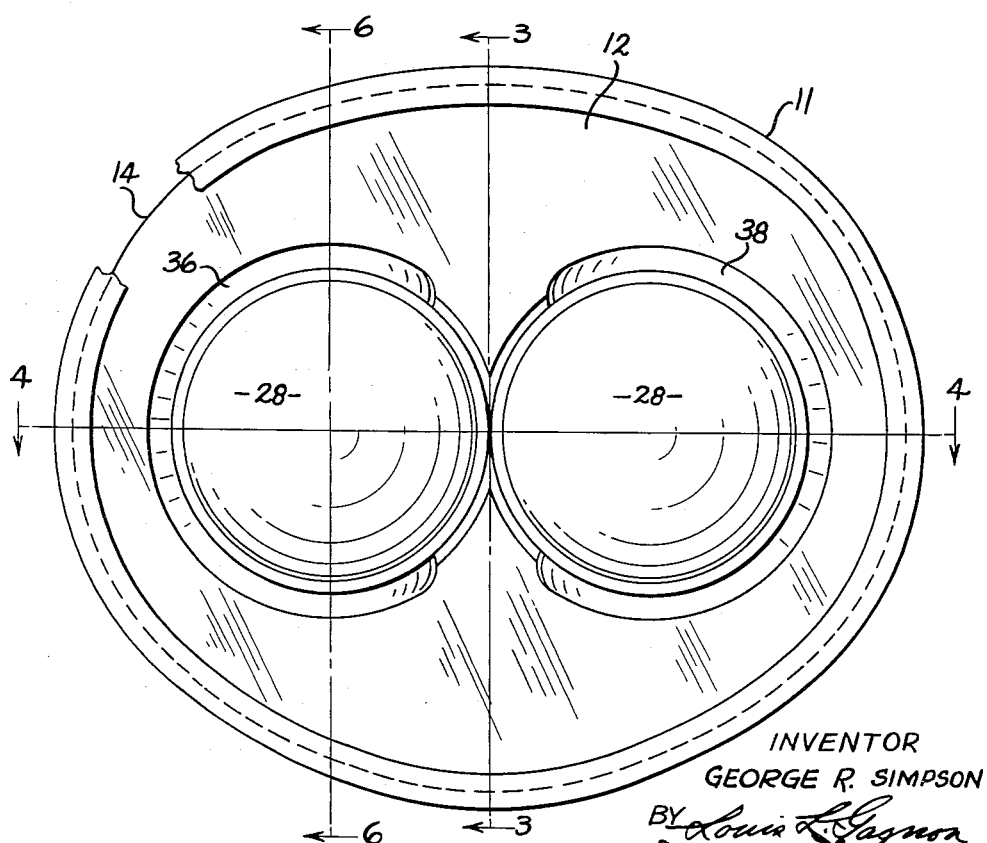
FIG. 2 is a front view of the goggle of FIG. 1, a part thereof being broken away to better show details of construction.

Referring to the drawings in detail and in particular FIG. 1, it will be seen that the pair of goggles 10 embodying the present invention comprises a preshaped mask or facepiece portion 11 formed of flexible rubber or the like so as to fit closely the contour of the face of a wearer thereof in such a way as to surround his or her eyes and nose. An adjustable strap of usual construction for retaining the facepiece snugly against the face of the wearer is indicated at 13. Carried by the facepiece is a plate-like supporting member 12 which has its oval-shaped peripheral edge 14 (see FIGS. 2, 3 and 4) enclosed within an endless annular groove 16 provided in the facepiece 11 and surrounding a sight opening 18 provided therein.

The plate-like supporting member 12 carries within its outer circumference a rearwardly extending lens cell supporting structure 20 which is of such irregular shape as to define a pair of rearwardly projecting well portions 22 and 24 into which a pair of lens cells 26 and 28 fit and these well portions 22 and 24 are separated from each other by a central interconnecting portion 30 shaped so as to accommodate the bridge portion of the nose of the wearer. As clearly shown in FIGS. 4 and 5, both rearwardly projecting well portions 22 and 24 are provided with rear walls 32 and 34 which are not only transparent but also plane parallel-sided so that they, in effect, constitute a pair of window-like regions for the goggles.

It will be noted that the rearwardly projecting well portions 22 and 24 provide external recesses 36 and 38 of suitable depth to accommodate the lens cells 26 and 28 with their rear ends in slightly spaced relation to the window-like rear walls 32 and 34. Each lens cell 26 and 28, comprises a frustum-conically-shaped hollow supporting member 40 which has its inner sloping side 42 shaped to fit closely against the adjacent sloping surface of the central supporting portion 30 to which each may be cemented or otherwise permanently secured thereto. Each cell 26, and 28, is completed by having applied to front and rear parts of hollow-supporting member 40, a pair of substantially no power concave-convex lens elements 44 and 46 which fit into suitably formed oppositely outwardly-facing annular grooves 47 and 48 therein. In this manner notwithstanding the fact that the space 49 between each pair of lens elements 44 and 46 is filled with air, nevertheless, inward movement of the lens elements toward each other due to hydraulic pressure when the goggles are submerged will not occur.

It should be clear from inspection of FIG. 4, that when the goggles are being worn and are submerged, water will flow into the recesses indicated at 36 and 38 and thus into locations between each transparent window portion 32, or 34, and the rear lens element 46 adjacent thereto. At the same time, water will be in contact with the exposed outer surface of the lens element 44. Such conditions are indicated in fragmentary FIG. 6A, and thus there will be, in effect, formed before each eye of the wearer of the goggles not only a positive liquid lens element 52 in the space between window 32 and lens element 46 but also an air lens in space 49 between no power elements 44 and 46.

As will be more fully described hereinafter, the result of such an arrangement when in use in water is that these parts function as an inverted galilean-type telescope of .75 power, and since the refractive index of water is 1.333, the optical system will make submerged objects appear to the wearer to be of natural size and in proper perspective.

The displacement which takes place in light rays traveling from a submerged object to the wearer of the goggles while swimming under water is diagrammatically indicated in FIG. 6A by ray 54 which is shown parallel to the optical axis O of the lens cell 26 as it impinges upon lens element 44 and is spaced a distance $h_W$ from the axis. This ray will be refracted inwardly slightly toward the axis in passing through this element made of plastic, since plastic has a higher index than water. The ray will then deviate outwardly a greater amount as it travels a much greater controlled distance through the air space 49. Passing through lens element 46, the ray will again refract inwardly, and through the water lens 52 and window 32 the ray will travel in a direction parallel to the axis and will be at a greater distance $h_A$ from the optical axis.

On the other hand, when the wearer of the goggles leaves the water, he will immediately be able to see objects around him clearly and at nearly their true size without removing his or her goggles since the water between lens element 46 and window 32 will drain out immediately and allow, as shown in FIG. 6, light rays 56 traveling parallel to the optical axis to reach the wearer's eye without change except for a sidewise displacement produced by the thickness of the no power lens elements 44 and 46. The ray height outwardly of the lens cell 26 is indicated at $h_{A1}$ and its height inwardly thereof by $h_{A2}$. The small amount of foreshortening or image magnification provided objects being observed in air will not be objectionable since the goggles will ordinarily be removed promptly and, on the other hand, the freedom from distortion gained during their use under water more than offsets this disadvantage in air.

In order that lens elements 44 and 46 of FIG. 6 and 6A will have, in effect, substantially zero power during use under water, the optical systems of the goggles may be independently formed to the following optical values:

Case #1

$R_1 = 33.50$
$t_1 = 3.00$
$R_2 = 32.47$
$s = 34.53$
$R_3 = 43.00$
$t_2 = 3.00$
$R_4 = 41.97$
$n_D = 1.523$ and wherein $R_1$ and $R_2$ are radii in millimeters of the front and rear surfaces of the lens element 44; $R_3$ and $R_4$ are radii of the front and rear surfaces of the lens element 46; $t_1$ and $t_2$ are the axial thicknesses of elements 44 and 46, respectively; $s$ is the axial space in between the elements; and $n_D$ is the refractive index of the plastic material from which the elements are formed.

Since the magnification which will be obtained by the #1 optical specification will be equal to the height $h_A$ of the ray 54 in the image space times the refractive index of the medium forming the image space divided by the height $h_W$ of the same ray in the object space times the refractive index of the medium forming the object space, it can readily be shown that, while the magnification obtained by this system in water will be 1.000, the magnification obtained by it in air will be 0.946. Or, in other words, a size error of about 5½% will be encountered while using the system in air. Nevertheless, such a goggle is well adapted for underwater exploring and the like at practically all ordinary depths and is fairly satisfactory in air.

It will be clear from the #2 optical specification which follows that the magnification error of such a system in air can be appreciably reduced mainly by reducing the thicknesses of the substantially no-power lens elements 44 and 46; and this accomplished without loss of the unit power magnification desired in water. Such an optical design having a better performance in air is as follows:

Case #2

$R_1 = 33.50$
$t_1 = 1.50$
$R_2 = 32.985$
$s = 33.836$
$R_3 = 43.00$
$t_2 = 1.50$
$R_4 = 42.485$
$n_D = 1.523$

In this latter specification, an improved magnification ratio in air of 0.973 was obtained. Or stated differently, only approximately 2½% size error in air will be experienced; while the system still has a unit magnification in water.

However, since the thicknesses of the lens elements 44 and 46 have been reduced to one-half of the lens thicknesses used in the first optical design, it may be that such a goggle construction would be recommended for shallow water uses only; as, for example, wherein the depths encountered did not exceed a certain specified value, in the neighborhood of 30′ or so.

Another improvement, insofar as the optical performance of the disclosed systems is concerned, might be obtained by the use of a doublet in place of one or the other or both of the lenses 44 and 46 to control chromatic aberration or the like.

It is possible to overcome completely such a magnification error in air while still providing a unit magnification in water. This is accomplished by the modified optical system indicated in FIG. 7 wherein a front lens element 62 of the lens cell is made to have a suitable negative power and proper outward curvature while a rear lens element 64 spaced a controlled distance therefrom is given a suitable positive power and proper outward curvature.

The optical design of this modified system is such that an entering ray, for example ray 66, travelling parallel to the optical axis will be directed outwardly in passing through the air space 68 an amount sufficient to substantially completely offset the combined inward displacements this ray experiences while passing through lens elements 62 and 64, and also the design is such that this ray will have upon emerging from element 64 its original direction.

On the other hand, a ray 70 travelling in water a distance $h_{W1}$ from the optical axis and parallel to the optical axis will be first so refracted inwardly by the front negative lens element 62 and then outwardly upon passing into and through the air space 68, that it will impinge upon positive lens element 64 at such a location and at such an angle as to have when it emerges therefrom a direction parallel to its original direction and a spacing $h_{A3}$ from the optical axis which will provide a magnification ratio of .75. When this is the case, the system in water or in air will cause objects to appear of proper size and in true perspective.

A satisfactory system of this improved type embodies the following values and has the additional advantage of being of a somewhat less over-size mainly since lens 62 and 64 are closer together:

*Case #3*

$R_1 = 33.00$
$t_1 = 5.25$
$R_2 = 25.48$
$s = 25.82$
$R_3 = 35.00$
$t_2 = 4.65$
$R_4 = 44.00$
$n_D = 1.523$ and wherein $R_1$ and $R_2$ are radii in millimeters of the front and rear surfaces of the lens element 62; $R_3$ and $R_4$ are radii of the front and rear surfaces of the lens element 64; $t_1$ and $t_2$ are the axial thicknesses of the elements respectively; $s$ is the axial space in between elements; $n_D$ is the refractive index of each element, and the refractive index of the water is 1.333. This specification will give a unit magnification in water and a unit magnification in air.

It has been found that, at times, small particles of sand, floating vegetation and the like may tend to enter the space between the window 32, or 34, and the lens cell forwardly thereof. This may be prevented by the use of a stamped fine mesh screen applied to the front face of the plate-like member 12 and of such shape as to fit about the lens cells 26 and 28 and overlie the entrances to recesses 36 and 38. Such a screen is shown at 72 in FIGS. 9 and 10 and may be provided with a pair of inwardly turned flanges 74 arranged to fit closely against the sides of the cells. Screen 72 is preferably removably held in place adjacent member 12 by a stamped retainer 76 of suitable shape having small self-threading screws 78 extending through openings therein and into the plastic of the material of plate-like member 12.

It is obvious that the outer surfaces of the windows 32 and 34 and the adjacent surfaces of the rear lens elements 46, or 64, of the lens cells may become dirtied, particularly when used in water that is not entirely clean and, accordingly, it will be clear from the modified construction shown in FIGS. 8 and 9 that the supporting body portions of both lens cells may be preformed as a unitary member, as shown at 80, into which the front and rear lens elements will be inserted and secured and this unitary member 80 removably held in fixed position against the central supporting portion 30 of the main supporting structure 20 by suitable means such as screw means 82 extending through the member 80 and having screw threaded engagement with central portion 30.

Accordingly, it will be a very simple operation to unscrew means 82 and remove the lens cell supporting member 80 for access to the windows 32 and 34 and to the rear surfaces of the rear lens elements for cleaning and the like, and this may be done at any time, whether the user is under water or not. It will even be appreciated that when the lens cell supporting member is removed for cleaning, the user may still obtain a clear, even though not necessarily distortion-free, view of objects about him.

In FIG. 8, there is also disclosed a double wall arrangement for the window portions of goggles, such being formed by a front wall 84 and a rear wall 86 in spaced relation to each other so that a dead-air space 88 will exist therebetween. The purpose of such an arrangement is to reduce as much as possible any tendency for fogging to occur upon the inner surface of the windows of the goggles while being used.

It will be noted that in the arrangement of the parts in the goggle constructions of the present invention, the rearwardly projecting window portions 32 and 34 and lens cells 26 and 28 in close relation thereto are fairly closely positioned with respect to the eyes of the wearer, in the neighborhood of 18–22 mm. or so. This is in order that not only will a clear and substantially undistorted view of objects be provided but also so that a fairly wide field of view will be enjoyed, conditions which could not possibly be obtained if, for example, the lens cells 26 and 28 had been physically supported in front of and in closely spaced relation to the flat disc-like window of a conventional underwater goggle. Furthermore, by providing a recessed supporting structure so that the lens cells are also appreciably recessed, the device as a whole is rendered much less vulnerable to injury, scratches, marring, and the like than would otherwise be the case.

Having described my invention, I claim:

1. An underwater goggle adapted to be positioned against the face of a wearer thereof in such a manner as to encircle his or her eyes for excluding water therefrom, said device comprising a preformed facepiece of suitable flexible material so as to yieldably fit the contour of the wearer's face and having a large opening formed in the forward part thereof, a rigid plate-like supporting structure carried by said facepiece and closing said opening, said supporting structure having a central portion thereof appreciably inwardly recessed and having the innermost part thereof arranged to form transparent window means conveniently located in front of the wearer's eyes, a pair of hollow air-tight lens cells carried by said supporting structure at fixed locations in said recessed portion and in front of said window means, each of said hollow lens cells forming an optical system in front of and in closely spaced relation to said window means and including front and rear similarly convexly curved substantially no-power lens elements in air-spaced relation to each other, the space between ecah rear convexly curved lens element and said window means communicating with the exterior so as to fill readily with water and define a water lens of appreciable positive power in front of said window means when the goggle is submerged, and also to empty readily and define merely an air space therebetween when in air, whereby a substantially distortion-free view of submerged objects at very nearly unit power magnification and correct perspective will be provided the wearer of said goggle while submerged and a very nearly unit power magnification and correct perspective will also be provided the wearer when not submerged.

2. An underwater goggle adapted to be positioned against the face of a wearer thereof in such a manner as to encircle his or her eyes for excluding water therefrom, said device comprising a preformed facepiece of suitable flexible material so as to yieldably fit the contour of the wearer's face and having a large opening formed in the forward part thereof, a rigid plate-like supporting structure carried by said facepiece and closing said opening, said supporting structure having a central portion thereof appreciably inwardly recessed and having the innermost part thereof arranged to form transparent window means conveniently located in front of the wearer's eyes, a pair of hollow air-tight lens cells carried by said supporting structure at fixed locations in said recessed portion and in front of said window means, each of said hollow lens cells forming an optical system in front of and in closely spaced relation to said window means and including front negative and rear positive similarly convexly curved lens elements of low refractive power in air-spaced relation to each other, the space between each rear convexly curved positive lens element and said window means communicating with the exterior so as to fill readily with water and define a water lens of appreciable positive power in front of said window means when the goggle is submerged, and also to empty readily and define merely an air space therebetween when in air, whereby a substantially distortion-free view of submerged objects at substantially unit power magnification and correct perspective will be provided the wearer of said goggle while submerged and a substantially unit power magnification and correct perspective will also be provided the wearer when not submerged.

3. An underwater goggle adapted to be positioned against the face of a wearer thereof in such a manner as to encircle his or her eyes for excluding water therefrom, said device comprising a preformed facepiece of suitable flexible material so as to yieldably fit the contour of the wearer's face and having a large opening formed in the forward part thereof, a rigid plate-like supporting structure carried by said facepiece and closing said opening, said supporting structure having a central portion thereof appreciably inwardly recessed and having the innermost part thereof arranged to form transparent window means conveniently located in front of the wearer's eyes, a pair of hollow air-tight lens cells carried by said supporting structure at fixed locations in said recessed portion and in front of said window means, each of said hollow lens cells forming an optical system in front of and in closely spaced relation to said window means and including front and rear similarly convexly curved substantially no-power lens elements in air-spaced relation to each other, the space between each rear convexly curved lens element and said window means communicating with the exterior so as to fill readily with water and define a water lens of appreciable positive power in front of said window means when the goggle is submerged, and also to empty readily and define merely an air space therebetween when in air, and a fine mesh screen extending between said supporting structure and each lens cell so as to exclude foreign matter from the spaces between said cells and said window means while admitting water therebetween, whereby a substantially distortion-free view of submerged objects at very nearly unit power magnification and correct perspective will be provided the wearer of said goggle while submerged and a very nearly unit power magnification and correct perspective will also be provided the wearer when not submerged.

4. An underwater goggle adapted to be positioned against the face of a wearer thereof in such a manner as to encircle his or her eyes for excluding water therefrom, said device comprising a preformed facepiece of suitable flexible material so as to yieldably fit the contour of the wearer's face and having a large opening formed in the forward part thereof, a rigid plate-like supporting structure carried by said facepiece and closing said opening, said supporting structure having a central portion thereof appreciably inwardly recessed and having the innermost part thereof arranged to form transparent window means conveniently located in front of the wearer's eyes, a pair of hollow air-tight lens cells carried by said supporting structure at fixed locations in said recessed portion and in front of said window means, each of said hollow lens cells forming an optical system in front of and in closely spaced relation to said window means and including front and rear similarly convexly curved substantially no-power lens elements in air-spaced relation to each other, the space between each rear convexly curved lens element and said window means communicating with the exterior so as to fill readily with water and define a water lens of appreciable positive power in front of said window means when the goggle is submerged, and also to empty readily and define merely an air space therebetween when in air, and means for releasably retaining said lens cells in place in front of said window means, whereby a substantially distortion-free view of submerged objects at very nearly unit power magnification and correct perspective will be provided the wearer of said goggle while submerged and a very nearly unit power magnification and correct perspective will also be provided the wearer when not submerged.

5. An underwater goggle adapted to be positioned against the face of a wearer thereof in such a manner as to encircle his or her eyes for excluding water therefrom, said device comprising a preformed facepiece of suitable flexible material so as to yieldably fit the contour of the wearer's face and having a large opening formed in the forward part thereof, a rigid plate-like supporting structure carried by said facepiece and closing said opening, said supporting structure having a central portion thereof appreciably inwardly recessed and having the innermost part thereof arranged to form transparent window means conveniently located in front of the wearer's eyes, a pair of hollow air-tight lens cells carried by said supporting structure at fixed locations in said recessed portion and in front of said window means, each of said hollow lens cells forming an optical system in front of and in closely spaced relation to said window means and including front and rear similarly convexly curved substantially no-power lens elements in air-spaced relation to each other, the space between each rear convexly curved lens element and said window means communicating with the exterior so as to fill readily with water and define a water lens of appreciable positive power in front of said window means when the goggle is submerged, and also to empty readily and define merely an air space therebetween when in air, and means for releasably retaining said lens cells in place in front of said window means, said releasable means being of such a construction as to allow the wearer to remove said cells from the supporting structure at any time and without allowing water to reach the wearer's face, whereby a substantially distortion-free view of submerged objects at very nearly unit power magnification and correct perspective will be provided the wearer of said goggle while submerged and a very nearly unit power magnification and correct perspective will also be provided the wearer when not submerged.

6. An underwater goggle adapted to be positioned against the face of a wearer thereof in such a manner as to encircle his or her eyes for excluding water therefrom, said device comprising a preformed facepiece of suitable flexible material so as to yieldably fit the contour of the wearer's face and having a large opening formed in the forward part thereof, a rigid plate-like supporting structure carried by said facepiece and closing said opening, said supporting structure having a central portion thereof appreciably inwardly recessed and having the innermost part thereof arranged to form transparent window means conveniently located in front of the wearer's eyes, a pair of hollow air-tight lens cells carried by said supporting structure at fixed locations in said recessed portion and in front of said window means, each of said hollow lens cells forming an optical system in front of and in closely spaced relation to said window means and including front and rear similarly convex curved substantially no-power lens elements in air-spaced relation to each other, the space between each rear convexly curved lens element and said window means communicating with the exterior so as to fill readily with water and define a water lens of appreciable positive power in front of said window means when the goggle is submerged, and also to empty readily and define merely an air space therebetween when in air, a fine mesh screen extending between said supporting structure and each lens cell so as to exclude foreign matter from the spaces between said cells and said window means while admitting water therebetween, and means for releasably retaining said screen and said lens cells in place in front of said window means, whereby a substantially distortion-free view of submerged objects at very nearly unit power magnification and correct perspective will be provided the wearer of said goggle while submerged and a very nearly unit power magnification and correct perspective will also be provided the wearer when not submerged.

7. An underwater goggle adapted to be positioned against the face of a wearer thereof in such a manner as to encircle his or her eyes for excluding water therefrom, said device comprising a preformed facepiece of suitable flexible material so as to yieldably fit the contour of the wearer's face and having a large opening formed in the forward part thereof, a rigid plate-like supporting structure carried by said facepiece and closing said opening, said supporting structure having a central portion thereof appreciably inwardly recessed and having the innermost part thereof arranged to form transparent window means conveniently located in front of the wearer's eyes, said transparent window means being in the form of a pair of transparent plate-like elements positioned in closely spaced parallel relation to each other so as to provide a dead-air space therebetween, a pair of hollow air-tight lens cells carried by said supporting structure at fixed locations in said recessed portion and in front of said window means, each of said hollow lens cells forming an optical system in front of and in closely spaced relation to said window means and including front and rear similarly convexly curved substantially no-power lens elements in air-spaced relation to each other, the space between each rear convexly curved lens element and said window means communicating with the exterior so as to fill readily with water and define a water lens of appreciable positive power in front of said window means when the goggle is submerged, and also to empty readily and define merely an air space therebetween in air, whereby a substantially distortion-free view of submerged objects at very nearly unit power magnification and correct perspective will be provided the wearer of said goggle while submerged and a very nearly unit power magnification and correct perspective will also be provided the wearer when not submerged.

8. An underwater goggle adapted to be positioned against the face of a wearer thereof in such a manner as to encircle his or her eyes for excluding water therefrom, said device comprising a preformed facepiece of suitable flexible material so as to yieldably fit the contour of the wearer's face and having a large opening formed in the forward part thereof, a rigid plate-like supporting structure carried by said facepiece and closing said opening, said supporting structure having a central portion thereof appreciably inwardly recessed and having the innermost part thereof arranged to form transparent window means conveniently located in front of the wearer's eyes, a pair of hollow air-tight lens cells carried by said supporting structure at fixed locations in said recessed portion and in front of said window means, each of said hollow lens cells forming an optical system in front of and in closely spaced relation to said window means and including front and rear relatively thin similarly convexly curved substantially no-power lens elements in air-spaced relation to each other, the radii of curvature of the front and rear surfaces of the front substantially no-power lens element being between approximately 32 and 34 millimeters, the corresponding radii of the rear substantially no-power lens element being between approximately 41 and 43 millimeters, the air spacing between said lens elements being between approximately 33 and 35 millimeters and both lens elements having like predetermined refractive indices, the space between each rear convexly curved lens element and said window means communicating with the exterior so as to fill readily with water and define a water lens of appreciable positive power in front of said window means when the goggle is submerged, and also to empty readily and define merely an air space therebetween when in air, whereby a substantially distortion-free view of submerged objects at very nearly unit power magnification and correct perspective will be provided the wearer of said goggle while submerged and a very nearly unit power magnification and correct perspective will also be provided the wearer when not submerged.

References Cited in the file of this patent

UNITED STATES PATENTS

| | | |
|---|---|---|
| 1,258,097 | Day | Mar. 5, 1918 |
| 2,001,683 | Jackman | May 14, 1935 |
| 2,008,530 | Wick | July 16, 1935 |
| 2,088,262 | Grano | July 27, 1937 |
| 2,130,127 | Fischer | Sept. 13, 1938 |
| 2,248,864 | Greiner | July 8, 1941 |
| 2,730,014 | Ivanoff et al. | Jan. 10, 1956 |

FOREIGN PATENTS

| | | |
|---|---|---|
| 1,040,064 | France | May 20, 1953 |
| 1,112,278 | France | Nov. 9, 1955 |